(12) United States Patent
Gonion et al.

(10) Patent No.: US 12,373,217 B2
(45) Date of Patent: *Jul. 29, 2025

(54) INDIRECT BRANCH PREDICTOR STORING ENCRYPTED BRANCH INFORMATION FIELDS

(71) Applicant: Apple Inc., Cupertino, CA (US)

(72) Inventors: Jeffry E. Gonion, Campbell, CA (US); Ian D. Kountanis, Santa Clara, CA (US); Conrado Blasco, Sunnyvale, CA (US); Steven Andrew Myers, San Jose, CA (US); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/932,883

(22) Filed: Sep. 16, 2022

(65) Prior Publication Data

US 2023/0010948 A1 Jan. 12, 2023

Related U.S. Application Data

(63) Continuation of application No. 16/220,488, filed on Dec. 14, 2018, now Pat. No. 11,449,343.

(51) Int. Cl.
| G06F 9/38 | (2018.01) |
| G06F 9/30 | (2018.01) |
| G06F 9/455 | (2018.01) |
| G06F 21/60 | (2013.01) |

(52) U.S. Cl.
CPC ........ *G06F 9/3844* (2013.01); *G06F 9/30029* (2013.01); *G06F 9/3861* (2013.01); *G06F 9/45533* (2013.01); *G06F 21/60* (2013.01)

(58) Field of Classification Search
CPC ............................. G06F 9/3844; G06F 9/3861
See application file for complete search history.

(56) References Cited

U.S. PATENT DOCUMENTS

| 5,935,241 | A | 8/1999 | Shiell et al. |
| 6,212,629 | B1 | 4/2001 | McFarland et al. |
| 8,762,694 | B1 | 6/2014 | Zou et al. |
| 8,955,111 | B2 | 2/2015 | Glew et al. |
| 10,037,288 | B2 | 7/2018 | Guim et al. |
| 11,449,343 | B2 | 9/2022 | Gonion et al. |

(Continued)

*Primary Examiner* — Jacob Petranek

(74) *Attorney, Agent, or Firm* — Robert C. Kowert; Kowert, Hood, Munyon, Rankin & Goetzel, P.C.

(57) ABSTRACT

A system and method for efficiently protecting branch prediction information. In various embodiments, a computing system includes at least one processor with a branch predictor storing branch target addresses and security tags in a table. The security tag includes one or more components of machine context. When the branch predictor receives a portion of a first program counter of a first branch instruction, and hits on a first table entry during an access, the branch predictor reads out a first security tag. The branch predictor compares one or more components of machine context of the first security tag to one or more components of machine context of the first branch instruction. When there is at least one mismatch, the branch prediction information of the first table entry is not used. Additionally, there is no updating of any branch prediction training information of the first table entry.

20 Claims, 9 Drawing Sheets

(56) References Cited

U.S. PATENT DOCUMENTS

| | | |
|---|---|---|
| 2015/0268957 A1 | 9/2015 | Bonanno et al. |
| 2018/0365015 A1 | 12/2018 | Lee et al. |
| 2019/0042263 A1 | 2/2019 | Sukhomlinov et al. |
| 2019/0163902 A1 | 5/2019 | Reid et al. |
| 2019/0166158 A1 | 5/2019 | Grocutt et al. |
| 2019/0227802 A1* | 7/2019 | Kessler ............... G06F 9/3848 |
| 2019/0303161 A1* | 10/2019 | Nassi ................... G06F 9/3844 |
| 2020/0057641 A1 | 2/2020 | Leenstra et al. |

\* cited by examiner

INDIRECT BRANCH PREDICTOR STORING ENCRYPTED BRANCH INFORMATION FIELDS

CROSS REFERENCE TO RELATED APPLICATIONS

This application is a continuation of U.S. patent application Ser. No. 16/220,488, now U.S. Pat. No. 11,449,343, entitled "INDIRECT BRANCH PREDICTOR STORING ENCRYPTED BRANCH INFORMATION FIELDS AND SECURITY TAG FOR SECURITY PROTECTION", filed Dec. 14, 2018, the entirety of which is incorporated herein by reference.

BACKGROUND

Technical Field

Embodiments described herein relate to the field of computing systems and, more particularly, to efficiently protecting branch prediction information.

Description of the Related Art

Modern instruction schedulers in microprocessors select multiple dispatched instructions out of program order to enable more instruction level parallelism, which reduces instruction latencies and increases performance. Additionally, microprocessors use store-to-load forwarding to send the data corresponding to a store instruction to a dependent load instruction. To further increase performance and reduce instruction latencies, the microprocessor performs speculative execution by predicting events that may happen in upcoming pipeline stages. One example is predicting the target address of control transfer instructions as well as the direction (e.g., taken or not-taken). Examples of control transfer instructions are conditional branch instructions, jump instructions, call instructions in subroutine prologues and return instructions in subroutine epilogues.

The direction and the target address of the control transfer instruction is used to update the program counter (PC) register holding the address of the memory location storing the next one or more instructions of a computer program to fetch. During speculative execution, each of the direction and the target address are predicted in a first pipeline stage. The direction and the target address are resolved in a second pipeline stage that is one or more pipeline stages after the first pipeline stage. In the meantime, between the first and the second pipeline stages, younger instructions, which are dependent on the control transfer instruction, are selected out-of-order for issue and execution.

Branch predictors typically include a table with entries storing branch prediction information such as a branch target address. One example is an indirect branch predictor. Branch predictor tables are susceptible to malicious attacks. Malicious users use malicious code to control a processor, and this control typically leads to accessing sensitive data. One example of malicious code are instructions written by the malicious users and injected into a computing system, which are voluntarily executed by the user. For example, when the user voluntarily selects (clicks) on an attachment on a web page or in electronic mail (email), the malicious code is run by the processor.

Another example of malicious code is a code re-use attack. The malicious user has access to one or more of compiled binary code, the operating system's shared libraries, and so forth. The malicious user searches for instruction sequences within the process address space that access sensitive data. The malicious user inserts or overwrites branch prediction information in a branch prediction table, which causes the processor to direct control flow of a computer program to the malicious memory location storing malicious code. This malicious code contains the instructions sequences found from the search. Although the branch misprediction is later detected and the machine state is reverted to the machine state prior to the mispredicted branch instruction, the access to the sensitive data has still occurred.

In view of the above, efficient methods and mechanisms for efficiently protecting branch prediction information are desired.

SUMMARY

Systems and methods for efficiently protecting branch prediction information are contemplated. In various embodiments, a computing system includes at least one processor with one or more branch predictors. At least one branch predictor stores branch target addresses in a table. In one example, the branch predictor stores branch target addresses for indirect branches. This branch predictor is susceptible to attacks from malicious users. In addition to storing a branch target address, each table entry also stores a security tag. The security tag includes one or more components of machine context. The machine context is the state of the processor while it is executing one or more processes and their corresponding threads. The machine context is the information used to restore and resume execution of the one or more processes, if needed.

One example of the machine context components placed in the security tag is an exception level. Software processes have an exception level different from an exception level of an operating system. Similarly, virtual machines have an exception level different from an exception level of a hypervisor. Therefore, attacks between the two can be detected using the exception level. Other examples of machine context components placed in the security tag are virtual machine identifiers, process identifiers, a privileged mode bit used by operating systems, and a portion of the program counter of a branch instruction.

When the branch predictor receives a portion of a first program counter of a first branch instruction, logic in the branch predictor accesses the table using the portion of the first program counter. For example, the logic generates a hash from the portion of the first program counter and maintained branch history information. In other examples, other values are additionally used in the hash function to generate the hash. The logic indexes into the table using the generated hash. When a hit occurs, such as on a first table entry, the logic reads out a first security tag from the first table entry.

The logic compares one or more components of machine context of the first security tag to one or more components of machine context of the first branch instruction. When the logic determines at least one mismatch during the comparing, the logic prevents using branch prediction information of the first table entry. Additionally, the logic prevents updating any branch prediction training information of the first table entry. In some embodiments, the logic encrypts one or more of the security tag and the branch target address and stores the encrypted version in the table. Therefore, the values are decrypted prior to performing the comparing when the table is being accessed.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
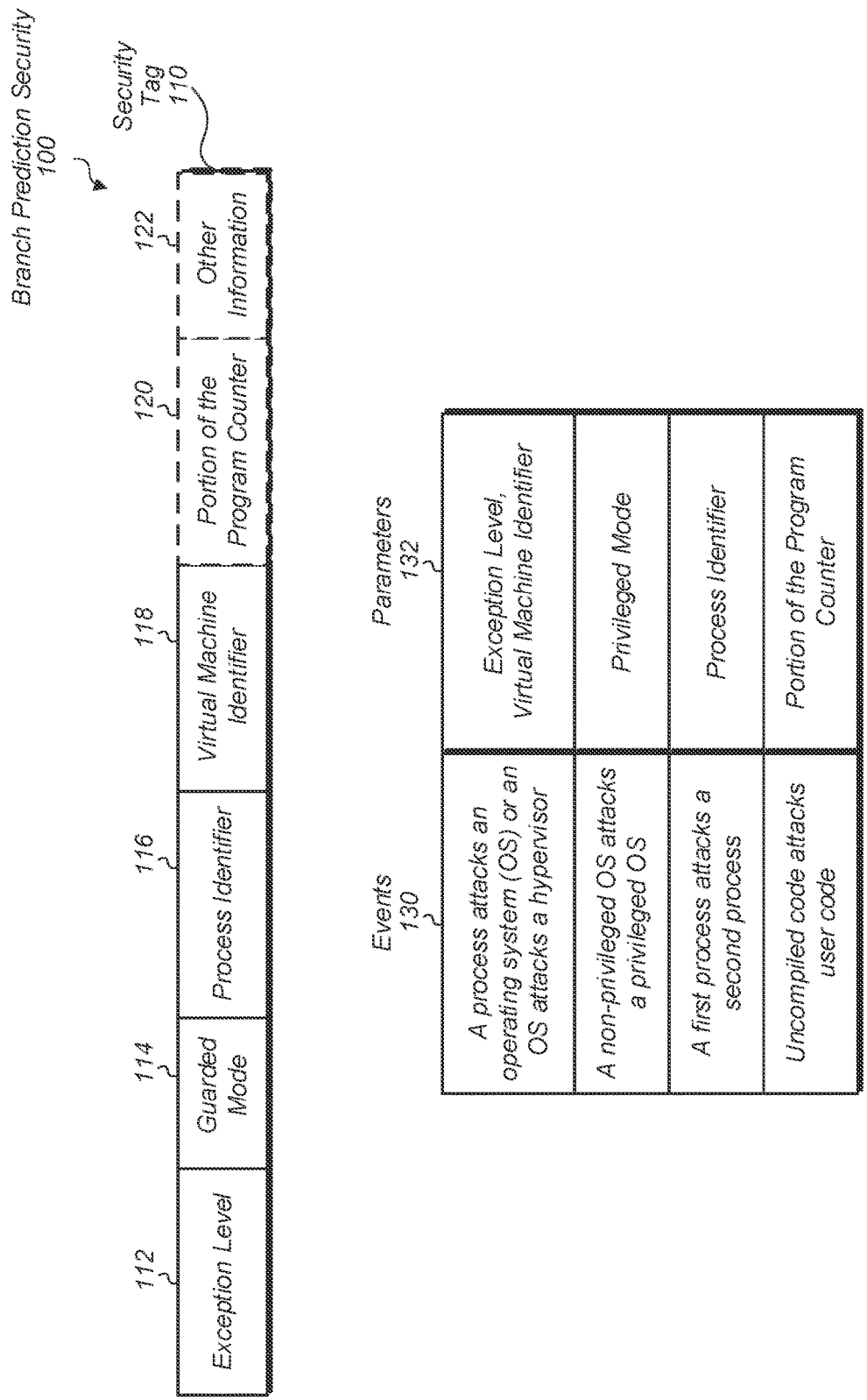
FIG. 1 is a block diagram of one embodiment of branch prediction security.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of branch prediction security 100 is shown. As shown, security tag 100 includes multiple fields such as fields 112-122. In various embodiments, one or more of the fields 112-122 stores a parameter, such as one of parameters 132, each associated with one or more events of events 130. In some embodiments, security tag 110 is stored in entries of a branch prediction table to combat security attacks on the branch prediction table. If a malicious user is able to overwrite or allocate an entry in the branch prediction table, then the malicious user is able to direct control of a software application to a particular memory location by providing a malicious branch target address. The events 130 list a sample of security attacks. The associated parameters 132 are used to detect whether one of these events has occurred. These parameters 132 are stored in the security tag 110 to aid detecting the events 130.

Although the parameters in the fields 112-122 are shown in a particular contiguous order, in other embodiments, another order is used and one or more of the fields 112-122 are arranged in a non-contiguous manner. In addition, one or more of the fields 112-122 are unused in the security tag 110. Further, one or more fields not shown are used in the security tag 110. For example, the field 122 includes other information not shown in the illustrated embodiment, but is used to detect security attacks.

In many designs, a branch prediction table, such as an indirect branch prediction table, stores a subset of the program counter (PC) in its table entries. This subset of the PC is used to index into the table and qualify an indexed entry as a hit (i.e., a match) with a tag. The subset of the PC leads to aliasing, which a malicious user can exploit. As shown, one event of events 130 is when a software process attacks an operating system (OS) or an OS attacks a hypervisor. In either case, one or more of the exception levels (ELs) and the virtual machine identifiers (VMIDs) differ from expected values. In an embodiment, the security tag 110 includes the exception level in field 112 and the VMID in field 118. However, these parameters are stored in other fields in other embodiments.

When a malicious user is able to control a virtual machine, typically, the malicious user accesses hypervisor data, which is normally inaccessible. However, in one example, a virtual machine has an exception level with a value or 0 or 1, whereas, the hypervisor has an exception level with a value of 2. Therefore, the exception levels can be used to detect whether the source attempting to modify a branch prediction table is a valid source. Similarly, a software process and an operating system have different exception levels. If the malicious user attempts to access information belonging to another virtual machine, then the VMIDs differ, and the field 118 of the security tag 110 stored in an entry of the branch prediction table is used to detect the attack. Without the security tag 110 stored in the branch predictor table, it is possible that the attack continues or completes undetected.

Another example of the above type of attack is when the malicious user is aware of a first PC of a kernel indirect branch instruction that contains a particular index and tag. The malicious user writes user code with an indirect branch instruction pointed to by a second PC that contains the same index and tag as the first PC. By using the second PC, the user code trains the indirect branch prediction table to provide a branch target address to malicious code. An indication in the security tag distinguishing between kernel code and user code detects this attack. The exception level is one example of this indication.

A second event of events 130 is when unguarded non-privileged operating system (OS) attacks a privileged OS. The privileged mode for an operating system is also referred to as the protected mode. In the privileged mode, the processor running the operating system detects when a first program attempts to write to memory locations used by a second program or by the kernel. In response, the processor notifies the kernel, which terminates the first program. During the second event of events 130, the privileged mode of parameters 132 differs between the OSes. In many examples, the privileged mode is a single bit. The field 114 of the security tag 110 stored in an entry of the branch predictor table is used to detect the attack. Without the security tag 110 stored in the branch predictor table, it is possible that the attack continues or completes undetected.

In a similar manner as the second event, a third event of events 130 is when a first process attacks a second process. During the third event of events 130, the process identifier of parameters 132 differs between the processes. The field 116 of the security tag 110 stored in an entry of the branch predictor table is used to detect the attack. For example, code for a malicious website is loaded by the web browser and executes on the user's computing device. The malicious code attempts to steal data from a banking application or other applications with access to sensitive data.

Another event of events 130 is when uncompiled code attacks user code. In one example, the uncompiled code is just-in-time (JIT) code. During this event, a portion of the program counter (PC) corresponding to the branch instruction differs between the uncompiled code and the user code. In one example, the PC points to the branch instruction stored in memory. In other examples, the PC points to a group of instructions stored in memory that include the branch instruction. The field 120 of the security tag 110 stored in an entry of the branch predictor table is used to detect the attack. For example, a first piece of code, which is malicious, executes with a same privilege level, a same process identifier, and a same virtual machine identifier. One example of this case is when JavaScript code runs in the same process as a trusted web browser. The malicious JavaScript code attempts to access data from the web browser application. Examples of the data are a browsing history, one or more passwords, and so forth. One solution is to widen the portion of the PC in the field 120 of the security tag 110. Another solution is to combine the portion of the PC with the branch target address. For example, the two values are combined using the Boolean exclusive-or (XOR) operation. The result is stored in the table entry of the indirect branch prediction table and later verified when the table entry is accessed.

During any one of the events of events 130, an attack has occurred and detecting the attack is done by storing the security tag 110 in each entry of the branch prediction table. In an embodiment, the branch prediction table is used for predicting the target address of indirect branches. When a given entry is allocated in the branch prediction table, the security tag 110 indicates a specific source of the predicted branch target address. At a later point in time, the branch prediction table is accessed. For example, a hash value is used to index into the branch prediction table. In one example, the hash value is generated from the program counter and history information and hits on the given entry. However, if one or more of the fields in the security tag 110 do not match, then the branch prediction is ignored and no updates occur for the given entry (e.g., updates of the history information, branch prediction training information, or otherwise). In some embodiments, an exception is generated to notify the operating system of the malicious access.

Figure 2:
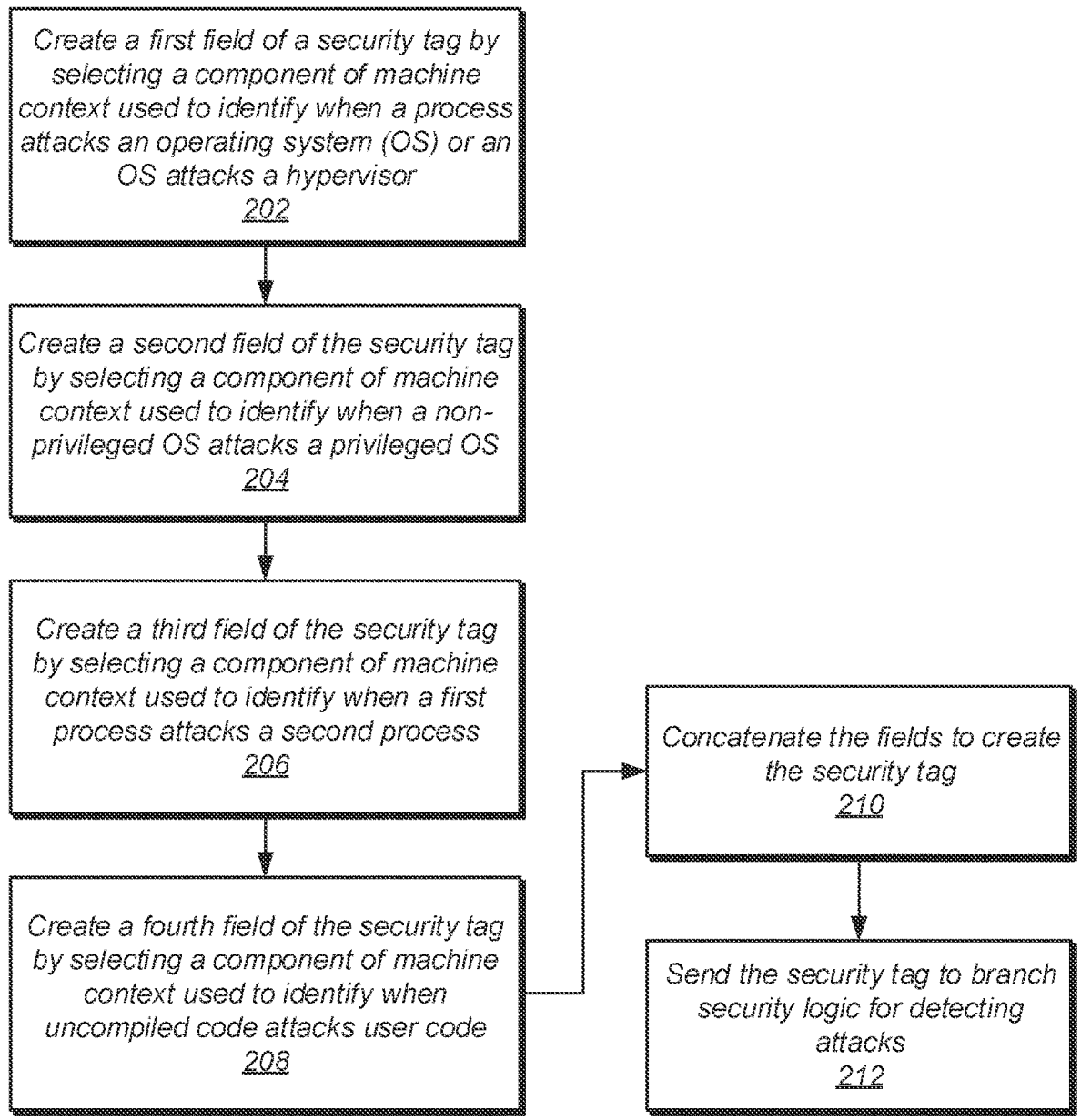
FIG. 2 is a flow diagram of one embodiment of a method for efficiently protecting branch prediction information.

Turning now to FIG. 2, a generalized flow diagram of one embodiment of a method 200 for efficiently protecting branch prediction information is shown. For purposes of discussion, the steps in this embodiment (as well as for FIGS. 5-7) are shown in sequential order. However, in other embodiments some steps may occur in a different order than shown, some steps may be performed concurrently, some steps may be combined with other steps, and some steps may be absent.

A security tag is stored in entries of a branch prediction table to protect the information stored in the branch prediction table. In one example, the table is used to provide predicted branch target addresses for indirect branch instructions. The security tag includes multiple fields with each field used to detect a respective type of malicious attack. Each field stores a parameters corresponding to a particular portion of the machine context. The machine context is the state of the processor while it is executing one or more processes and their corresponding threads. The machine context is the information used to restore and resume execution of the one or more processes, if needed. A first field of the security tag is created by selecting a component of machine context used to identify when a process attacks an operating system (OS) or an OS attacks a hypervisor (block 202). For example, one or more of the exception levels (ELs) and the virtual machine identifiers (VMIDs) are placed in the security tag.

A second field of the security tag is created by selecting a component of machine context used to identify when a non-privileged OS attacks a privileged OS (block 204). In one example, the privileged mode bit is placed in the security tag. A third field of the security tag is created by selecting a component of machine context used to identify when a first process attacks a second process (block 206). The process identifier differs between processes, and it is inserted in the security tag.

A fourth field of the security tag is created by selecting a component of machine context used to identify when uncompiled code attacks user code (block 208). For example, when just-in-time (JIT) code attacks user code, at least a portion of the program counter (PC) of the branch instruction differs. Therefore, in some examples, the portion of the PC of the branch instruction is placed in the security tag. The fields are concatenated to create the security tag (block 210), and the security tag is sent to branch security logic for detecting attacks (block 212). For example, the security tag is stored in the entries of the branch prediction table and later compared when the particular entry is accessed by a subsequent branch instruction. In various embodiments, the logic described herein may include hardware (e.g., circuitry) and/or software (e.g., executable instructions).

Figure 3:
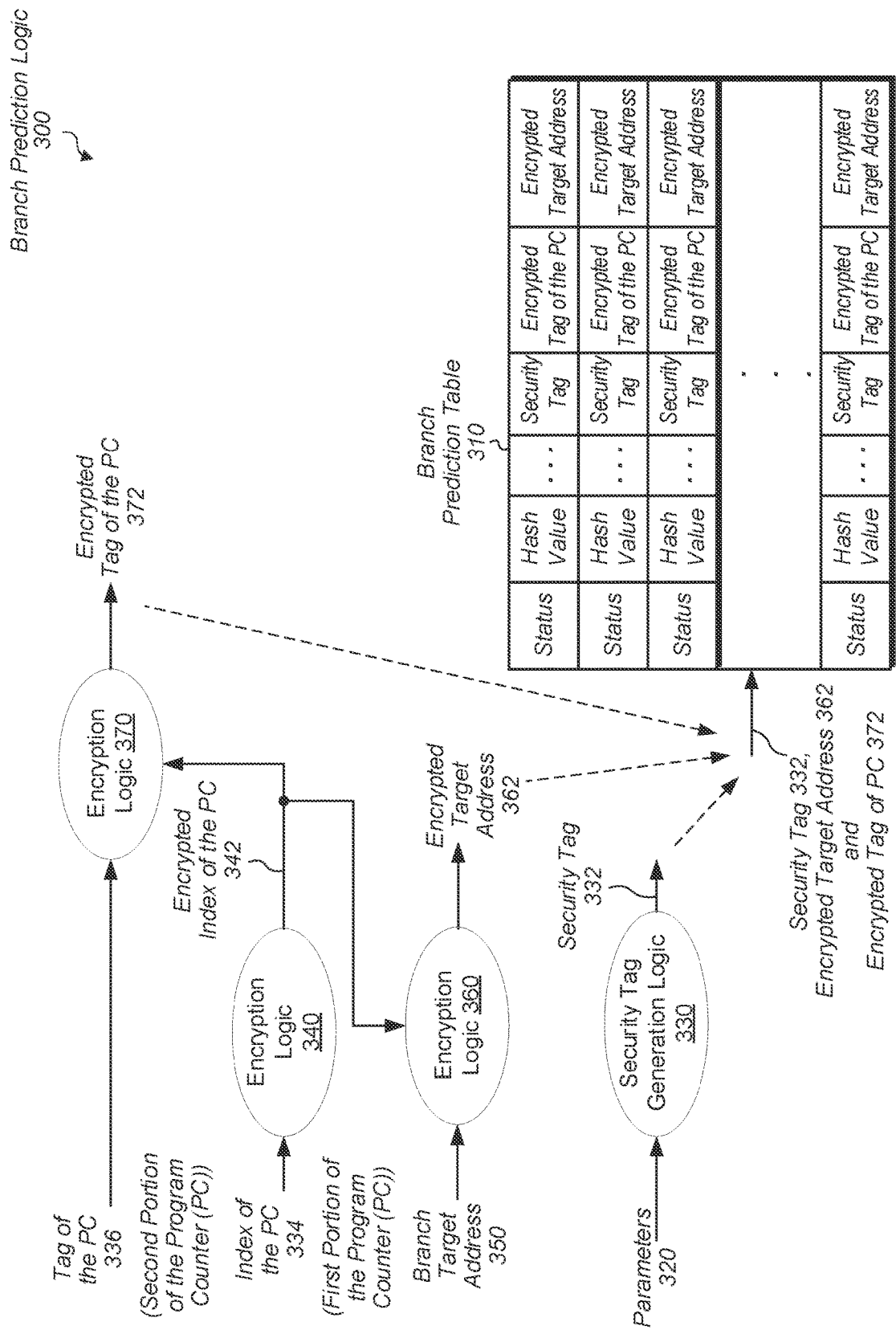
FIG. 3 is a block diagram of one embodiment of branch prediction logic.

Referring to FIG. 3, a generalized block diagram of one embodiment of branch prediction logic 300 is shown. Branch prediction logic 300 includes branch prediction table 310 (or table 310) and multiple logic blocks 330, 340, 360 and 370. In some embodiments, the branch prediction logic 300 is used for indirect branch instructions (or indirect branches). In other embodiments, the branch prediction logic 300 is used for other types of branches.

As shown, each table entry of table 310 stores multiple fields. A status field includes a valid bit and metadata such as a source identifier, an age, a value for a least-recently-used (LRU) replacement scheme, and so forth. The hash value stores a hash generated at the time the table entry was allocated for a branch instruction. Any one of a variety of hash functions, or algorithms, is used to generate the hash value. A portion of the program counter of the branch instruction and branch history information is input to the hash algorithm to generate the hash value. In some examples, one or more other inputs are additionally used such as a key, a timestamp, and so on.

Each table entry of table 310 also stores a security tag and branch prediction information. In various embodiments, the security tag 332 is equivalent to the security tag 110 (of FIG. 1). In some embodiments, the branch prediction information is a branch target address. In other embodiments, the branch prediction information is information used to predict a branch direction (e.g., taken or not-taken). The branch prediction logic 300 is used to allocate a table entry in table 310. Later, the branch prediction logic 400 (of FIG. 4) is shown for reading out information from table 310. Therefore, the branch prediction logic 300 is used for writing the table 310, and the branch prediction logic 400 is used for reading the table 310.

In the illustrated embodiment, the branch prediction logic 300 receives parameters 320, an index of the program counter (PC) 334, which is a first portion of the PC, corresponding to a branch instruction. In addition, the branch prediction logic 300 receives a branch target address 350. In various embodiments, the index of the PC 334 is a subset of a complete PC. Any subset of the PC is possible and contemplated. Although the branch target address 350 is shown, in other embodiments, other branch prediction information is used such as branch direction information. In one example, a 1-bit count, a 2-bit count, or other sized count is used. When a branch instruction is resolved, and there is no table entry for the branch instruction in the table 310, and the type of the branch instruction matches the type of branch instruction associated with the table 310, then a table entry is allocated in the table 310. For example, if an indirect branch instruction is resolved, but there is no allocated table entry in the table 310, and the table 310 is used for indirect branches, then a table entry is allocated in the table 310 for the branch instruction.

Once a table entry is selected for allocation in the table 310, as described earlier, a hash value is generated as described earlier and stored in the selected table entry. In an embodiment, the hash algorithm (not shown) receives the index of the PC 334. In another embodiment, the hash algorithm receives a different portion of the PC than the index of the PC 334. In some embodiments, the encryption logic 340, which is separate from the hash algorithm, encrypts the index of the PC 334 to generate the encrypted index of the PC 342. The encryption logic 340 includes one of a variety of encryption algorithms. In some examples, the encryption logic 340 receives other inputs (not shown) such as one or more of a timestamp, an encryption salt value, and so forth. The encryption salt value is a secret value from a security processor that changes at given points in time such as during each boot process. In some embodiments, the encrypted index of the PC 342 is used to encrypt one or more of the tag of the PC 336 and the branch target address 350.

The logic 360 receives the branch target address 350 and generates the encrypted branch target address 362. In an embodiment, the logic 360 uses any one of a variety of encryption algorithms. In one example, the logic 360 uses Boolean exclusive-OR (XOR) logic. In an embodiment, the logic 360 combines the branch target address 350 and the encrypted index of the PC 342 using the Boolean XOR logic to generate the encrypted branch target address 362. The encrypted branch target address 362 is stored in the selected table entry being allocated.

In an embodiment, the security tag generation logic 330 uses the same encryption salt value used by the encryption logic 340. In some embodiments, the logic 370 is similar to the logic 360. Therefore, in some embodiments, the logic 370 combines the tag of the PC 336 and the encrypted index of the PC 342 using Boolean XOR logic to generate the encrypted tag of the PC 372. In various embodiments, parameters 320 are equivalent to the parameters 132 (of FIG. 1). Security tag generation logic 330 receives the parameters 320 and generates the security tag 332. Again, in various embodiments, the security tag 332 is equivalent to the security tag 110 (of FIG. 1). In some embodiments, the security tag generation logic 330 concatenates the selected parameters 320 in an expected order. The security tag 332 is stored in the selected table entry being allocated.

Figure 4:
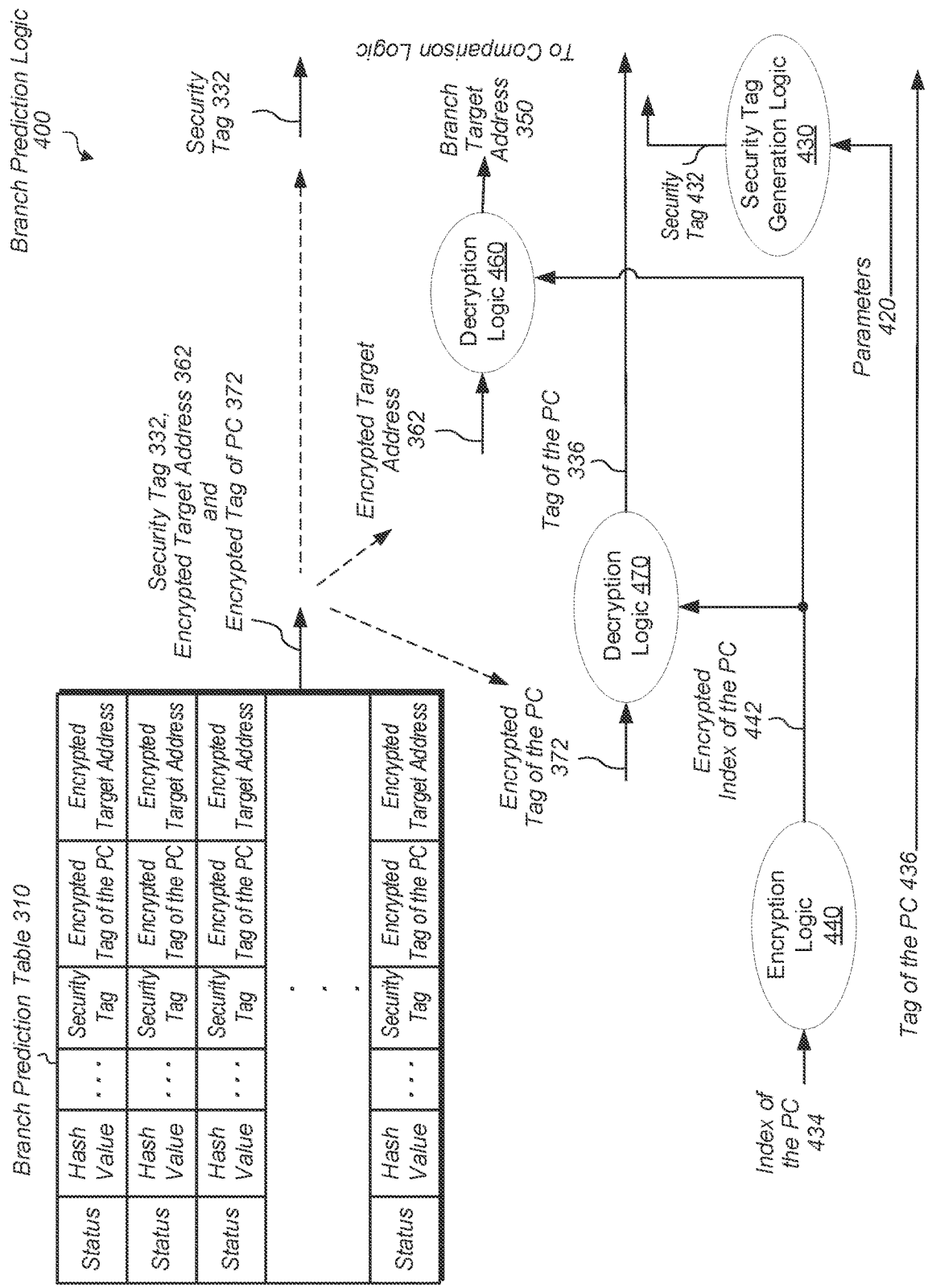
FIG. 4 is a block diagram of one embodiment of branch prediction logic.

Referring to FIG. 4, a generalized block diagram of one embodiment of branch prediction logic 400 is shown. Circuitry and logic previously described are numbered identically. Branch prediction logic 400 includes branch prediction table 310 (or table 310) and multiple logic blocks 440, 460 and 470. In some embodiments, the branch prediction logic 400 is used for indirect branch instructions (or indirect branches). In other embodiments, the branch prediction logic 400 is used for other types of branches.

When the branch prediction logic 400 receives a portion of a program counter (PC) of a branch instruction being predicted, access logic (not shown) in the branch prediction logic 400 accesses the table 310 using at least the received portion of the program counter. In some embodiments, the portion of the PC used for accessing the table 310 is the same as the index of the PC 434. For example, the access logic generates a hash from the index of the PC 434 and maintained branch history information. In other examples, other values are additionally used in the hash function to generate the hash. The access logic indexes into the table 310 using the generated hash. When a hit occurs, such as on a given table entry, the access logic reads out a security tag, a tag of the PC and branch prediction information from the given table entry. In some embodiments, the tag of the PC and branch prediction information are encrypted. In an embodiment, the branch prediction information is a branch target address. In the illustrated embodiment, the encrypted tag of the PC 372, the encrypted branch target address 362 and the security tag 332 are read out from the table 310.

In some embodiments, the encryption logic 440, which is separate from the hash algorithm, encrypts the index of the PC 434 to generate the encrypted index of the PC 442. In various embodiments, the encryption logic 440 is equivalent to the encryption logic 340 (of FIG. 3). The logic 460 receives the encrypted branch target address 362 and generates the decrypted branch target address 350, or simply, the branch target address 350. In an embodiment, the logic 460 is equivalent to the logic 360 (of FIG. 3) and uses Boolean exclusive-OR (XOR) logic. In an embodiment, the logic 460 combines the encrypted branch target address 362 and the encrypted index of the PC 442 using the Boolean XOR logic to generate the branch target address 350.

In a similar manner as described above, the logic 470 receives the encrypted tag of the PC 372 and generates the decrypted tag of the PC 336, or simply, the tag of the PC 336. In an embodiment, the logic 470 is equivalent to the logic 370 (of FIG. 3) and uses Boolean exclusive-OR (XOR) logic. In an embodiment, the logic 470 combines the encrypted tag of the PC 372 and the encrypted index of the PC 442 using the Boolean XOR logic to generate the tag of the PC 336. In various embodiments, parameters 420 are equivalent to the parameters 332 (of FIG. 3) and parameters 132 (of FIG. 1). Security tag generation logic 430 receives the parameters 420 and generates the security tag 432. In some embodiments, the security tag generation logic 430 is equivalent to the security tag generation logic 330 (of FIG. 3).

External comparison logic compares one or more components of machine context from the security tag 332 to one or more components of machine context of the security tag 432 to determine whether the access of the table 310 is a valid access. If the security tag 332 was further encrypted, then it is decrypted prior to the comparison. In some embodiments, the external comparison logic also compares the received tag of the PC 436 to the tag of the PC 336. When the comparison logic detects at least one mismatch during the comparison, in some embodiments the detected mismatch serves to prevent use of the branch target address 350. Additionally, the detected mismatch is used to prevent updating any branch prediction training information of the given table entry and any maintained global branch history information. In some embodiments, logic to prevent such updates is within the branch prediction logic 400. In other embodiments, the prevention logic is located external to the branch prediction logic 400.

Figure 5:
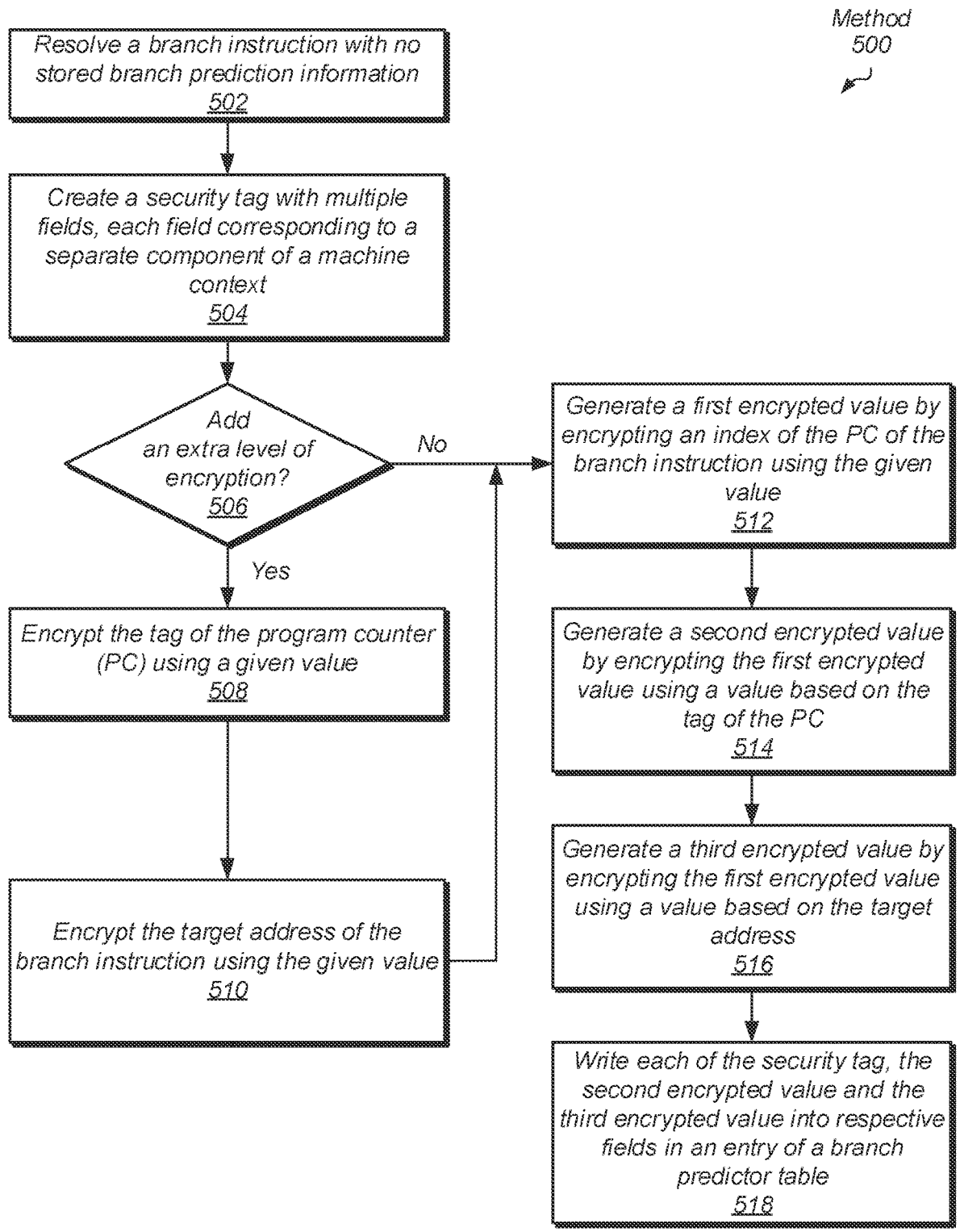
FIG. 5 is a flow diagram of one embodiment of a method for efficiently protecting branch prediction information.

Turning now to FIG. 5, a generalized flow diagram of one embodiment of a method 500 for efficiently protecting branch prediction information is shown. A branch instruction with no stored branch prediction information is resolved (block 502). For example, a branch instruction has been fetched, decoded, issued and executed in a processor core. Currently, no branch prediction tables store information for the branch instruction. Logic in the processor core creates a security tag with multiple fields, each field corresponding to a separate component of a machine context. The machine context is the state of the processor while it is executing one or more processes and their corresponding threads. The machine context is the information used to restore and resume execution of the one or more processes, if needed. An example of the security tag is the security tag 110 illustrated previously in FIG. 1.

If an extra level of encryption is being added ("yes" branch of the conditional block 506), then logic encrypts the tag of the program counter (PC) using a given value (block 508). In an embodiment, the given value is an encryption salt value. In some examples, one or more other inputs are additionally used for encrypting the tag of the PC. Logic also encrypts the target address of the branch instruction using the given value (block 510). Therefore, in some embodiments, the logic uses the same encryption salt value to encrypt the branch target address. In other embodiments, the branch prediction information includes a branch direction, rather than a branch target address.

If an extra level of encryption is not being added ("no" branch of the conditional block 506), or blocks 508 and 510 have completed, then logic generates a first encrypted value by encrypting an index of the program counter (PC) of the branch instruction using the given value (block 512). Therefore, again, logic uses the same encryption salt value for encrypting the index of the PC. The logic generates a second encrypted value by encrypting the first encrypted value using a value based on the tag of the PC (block 514). In some examples, the value based on the tag of the PC is the tag of the PC. In other examples, the value based on the tag of the PC is an encrypted tag of the PC. In an embodiment, the logic generates the second encrypted value by combining the tag of the PC (or the encrypted tag of the PC) and the encrypted index of the PC using Boolean XOR logic.

The logic generates a third encrypted value by encrypting the first encrypted value using a value based on the target address (block 516). In some examples, the value based on the target address is the target address. In other examples, the value based on the target address is an encrypted target address. In an embodiment, the logic generates the third encrypted value by combining the target address (or the encrypted target address) and the encrypted index of the PC portion using Boolean XOR logic. The logic writes each of the security tag, the second encrypted value and the third encrypted value into respective fields in an entry of a branch predictor table (block 518).

Figure 6:
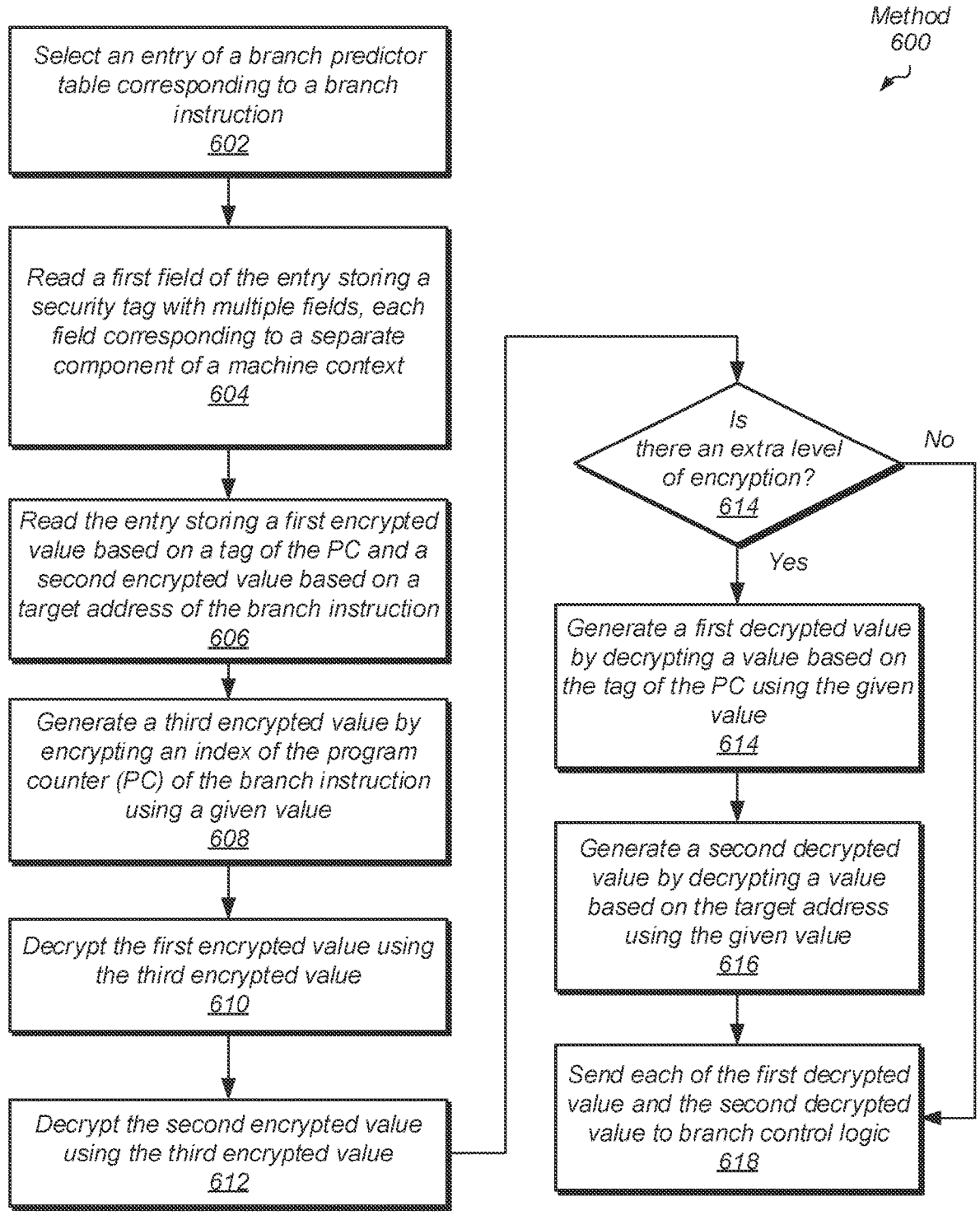
FIG. 6 is a flow diagram of one embodiment of a method for efficiently protecting branch prediction information.

Turning now to FIG. 6, a generalized flow diagram of one embodiment of a method 600 for efficiently protecting branch prediction information is shown. Logic in a processor core selects an entry of a branch predictor table corresponding to a branch instruction (block 602). For example, a branch instruction has been fetched, decoded, and prior to issue, it is being predicted. The logic generates a hash value from at least a portion of the PC of the branch instruction and indexes into the branch prediction table. The logic selects the branch prediction table based on the type of the branch prediction table. Alternatively, the logic indexes into multiple branch prediction tables without initially determining the type of the branch instruction.

After indexing into the branch prediction table, a hit occurs on a table entry of the branch prediction table. The logic reads a first field of the entry storing a security tag with multiple fields, each field corresponding to a separate component of a machine context (block 604). The logic reads a second field of the entry storing a first encrypted value based on the tag of the PC and a second encrypted value based on a target address of the branch instruction (block 606). The logic generates a third encrypted value by encrypting an index of the program counter (PC) of the branch instruction using a given value (block 608). In one example, the given value is an encryption salt value.

The logic decrypts the first encrypted value using the third encrypted value (block 610). In an embodiment, the logic combines the first encrypted value (encrypted tag of the PC) and the third encrypted value (encrypted index of the PC of the branch instruction) using the Boolean XOR logic to generate the decrypted tag of the PC. In some embodiments, since the tag of the PC was encrypted earlier during allocation of the table entry with Boolean XOR logic, the same logic is used to decrypt it. The logic decrypts the second encrypted value using the third encrypted value (block 612). In an embodiment, the logic combines the second encrypted value (encrypted target address) and the third encrypted value (encrypted portion of the PC) using the Boolean XOR logic to generate the decrypted branch target address.

If there is an extra level of encryption ("yes" branch of the conditional block 614), then the logic generates a first decrypted value by decrypting a value based on the tag of the PC using the given value (block 614). Again, in an example, the given value is an encryption salt value. Other values are possible and contemplated. The value based on the tag of the PC is an encrypted tag of the PC. The logic generates a second decrypted value by decrypting a value based on the target address using the given value (block 616) such as the encryption salt value. The logic sends each of the first decrypted value (tag of the PC) and the second decrypted value (branch target address) to branch control logic. For example, the branch control logic verifies whether the security tag of the branch instruction matches the security tag read out from the branch prediction table. Additionally, in some embodiments, the branch control logic compares the tag of the PC of the branch instruction accessing the table and the tag of the PC read out from the table.

Figure 7:
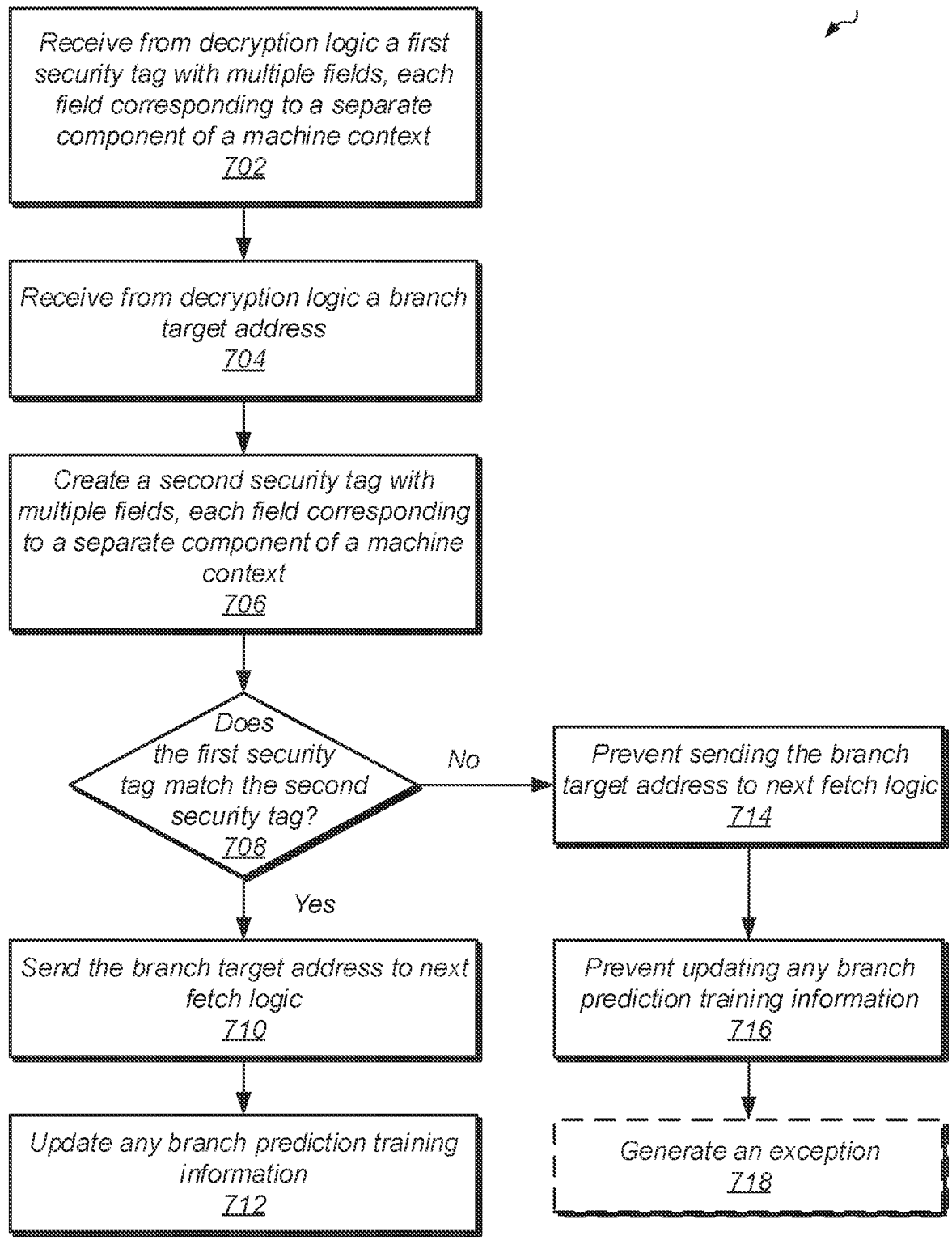
FIG. 7 is a flow diagram of one embodiment of a method for efficiently protecting branch prediction information.

Turning now to FIG. 7, a generalized flow diagram of one embodiment of a method 700 for efficiently protecting branch prediction information is shown. Logic in a processor core receives from decryption logic a first security tag with multiple fields, each field corresponding to a separate component of a machine context (block 702). For example, the first security tag was previously read out from a branch prediction table. The logic receives from decryption logic a branch target address (block 704). For example, the branch target address was previously read out from the same table entry of the same branch prediction table as the first security tag. The logic that performed the reading also performed the decryption.

The logic creates a second security tag with multiple fields, each field corresponding to a separate component of a machine context (block 706). The second security tag is based on machine context of a branch instruction that hit on the table entry storing the first security tag and the branch target address, which were read out. The logic compares the first security tag and the second security tag. In some embodiments, the logic also logic compares the tag of the PC of the branch instruction accessing the table and the tag of the PC read out from the table. If the first security tag matches the second security tag ("yes" branch of the conditional block 708), then the logic sends the branch target address to next fetch logic (block 710). The branch prediction information, such as the branch target address, is used. The logic updates any branch prediction training information (block 712) such as one or more of local and global branch history information. The steps performed in blocks 710-712 are only performed if any comparison of the tags of the PC also match.

If the first security tag does not match the second security tag ("no" branch of the conditional block 708), then the logic prevents sending the branch target address to next fetch logic (block 714). In addition, the logic prevents updating any branch prediction training information (block 716) such as one or more of local and global branch history information. In some embodiments, the logic generates an exception (block 718). The steps performed in blocks 714-716 are also performed if any comparison of the tags of the PC results in a mismatch.

Figure 8:
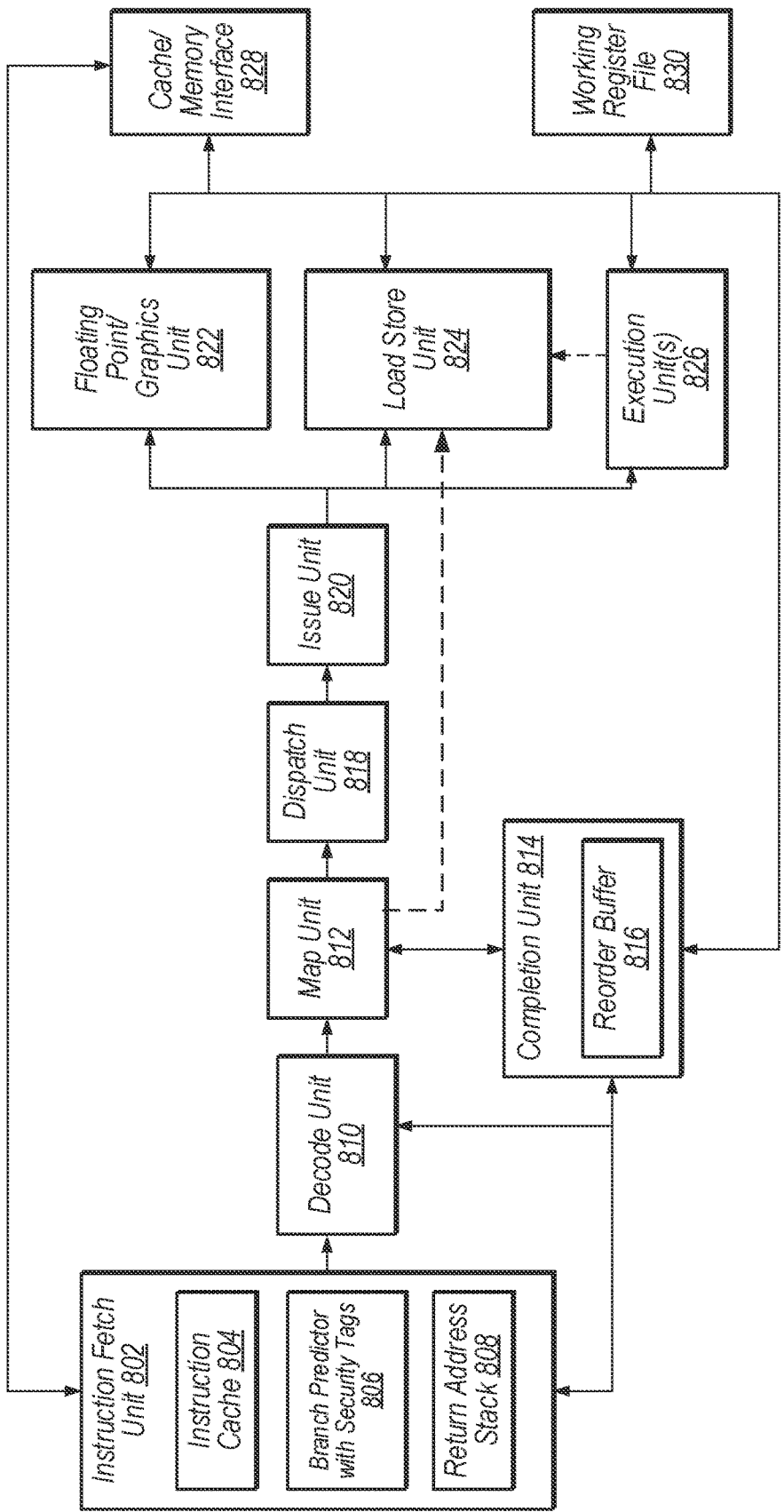
FIG. 8 is a block diagram of one embodiment of a processor core.

Turning now to FIG. 8, a block diagram illustrating one embodiment of a processor core 800 is shown. In various embodiments, the logic of processor core 800 is included in one or more cores of a central processing unit (CPU). Processor core 800 includes instruction fetch unit (IFU) 802 which includes an instruction cache 804, branch predictor 806 with security tags, and a return address stack (RAS) 808. IFU 802 also includes a number of data structures in addition to those shown such as an instruction translation lookaside buffer (ITLB), instruction buffers, and/or other structures configured to store state that is relevant to thread selection and processing (in multi-threaded embodiments of processor 800).

In various embodiments, IFU 802 includes multiple branch predictors including at least branch predictor 806 with security tags. In some embodiments, branch predictor 806 includes branch prediction logic similar to logic 300 (of FIG. 3) and logic 400 (of FIG. 4). For example, such a branch predictor is used to predict indirect branches. Fetched instructions are sent from the IFU 802 to decode unit 810, a map unit 812, a dispatch unit 818, and issue unit 820. Issue unit 820 is coupled to issue instructions to any of a number of instruction execution resources including execution unit(s) 826, a load store unit (LSU) 824, and/or a floating-point/graphics unit (FGU) 822.

The instruction execution resources 822-826 are coupled to a working register file 830. Additionally, LSU 824 is coupled to cache/memory interface 828. Reorder buffer 816 is coupled to IFU 802, decode unit 810, working register file 830, and the outputs of any number of instruction execution resources. It is noted that the illustrated embodiment is merely one example of how processor core 800 is implemented. In other embodiments, processor core 800 includes other components and interfaces not shown in FIG. 8. Alternative configurations and variations are possible and contemplated.

In one embodiment, IFU 802 is configured to fetch instructions from instruction cache 804 and buffer them for downstream processing. The IFU 802 also requests data from a cache or memory through cache/memory interface 828 in response to instruction cache misses, and predict the direction and target of control transfer instructions (e.g., branches).

The instructions that are fetched by IFU 802 in a given clock cycle are referred to as a fetch group, with the fetch group including any number of instructions, depending on the embodiment. The branch predictor 806 uses one or more branch prediction tables and mechanisms for determining a next fetch program counter sooner than the branch target address is resolved. In various embodiments, the predicted address is verified later in the pipeline by comparison to an address computed by the execution unit(s) 826. For the RAS 808, the predicted return address is verified when a return address (branch target address) is retrieved from a copy of the memory stack stored in the data cache via the LSU 824 and the cache interface 828.

In various embodiments, predictions occur at the granularity of fetch groups (which include multiple instructions). In other embodiments, predictions occur at the granularity of individual instructions. In the case of a misprediction, the front-end of pipeline stages of processor 800 are flushed and fetches are restarted at the new address. IFU 802 conveys fetched instruction data to decode unit 810. In one embodiment, decode unit 810 is configured to prepare fetched instructions for further processing.

Map unit 812 maps the decoded instructions (or uops) to physical registers within processor 800. Map unit 812 also implements register renaming to map source register addresses from the uops to the source operand numbers identifying the renamed source registers. Dispatch unit 818 dispatches uops to reservation stations (not shown) within the various execution units. Issue unit 820 sends instruction sources and data to the various execution units for picked (i.e., scheduled or dispatched) instructions. In one embodiment, issue unit 820 reads source operands from the appropriate source, which varies depending upon the state of the pipeline.

In the illustrated embodiment, processor core 800 includes a working register file 830 that stores instruction results (e.g., integer results, floating-point results, and/or condition signature results) that have not yet been committed to architectural state, and which serve as the source for certain operands. The various execution units also maintain architectural integer, floating-point, and condition signature state from which operands may be sourced.

Instructions issued from issue unit 820 proceed to one or more of the illustrated execution units to be performed. In one embodiment, each of execution unit(s) 826 is similarly or identically configured to perform certain integer-type instructions defined in the implemented ISA, such as arithmetic, logical, and shift instructions. Load store unit (LSU) 824 processes data memory references, such as integer and floating-point load and store instructions and other types of memory reference instructions. In an embodiment, LSU 824 includes a data cache (not shown) as well as logic configured to detect data cache misses and to responsively request data from a cache or memory through cache/memory interface 828. Floating-point/graphics unit (FGU) 822 performs and provide results for certain floating-point and graphics-oriented instructions defined in the implemented ISA.

In the illustrated embodiment, completion unit 814 includes reorder buffer (ROB) 816 and coordinates transfer of speculative results into the architectural state of processor 800. Entries in ROB 816 are allocated in program order. Completion unit 814 includes other elements for handling completion/retirement of instructions and/or storing history including register values, etc. In some embodiments, speculative results of instructions are stored in ROB 816 before being committed to the architectural state of processor 800, and confirmed results are committed in program order. Entries in ROB 816 are marked as completed when their results are allowed to be written to the architectural state. Completion unit 814 also coordinates instruction flushing and/or replaying of instructions.

Figure 9:
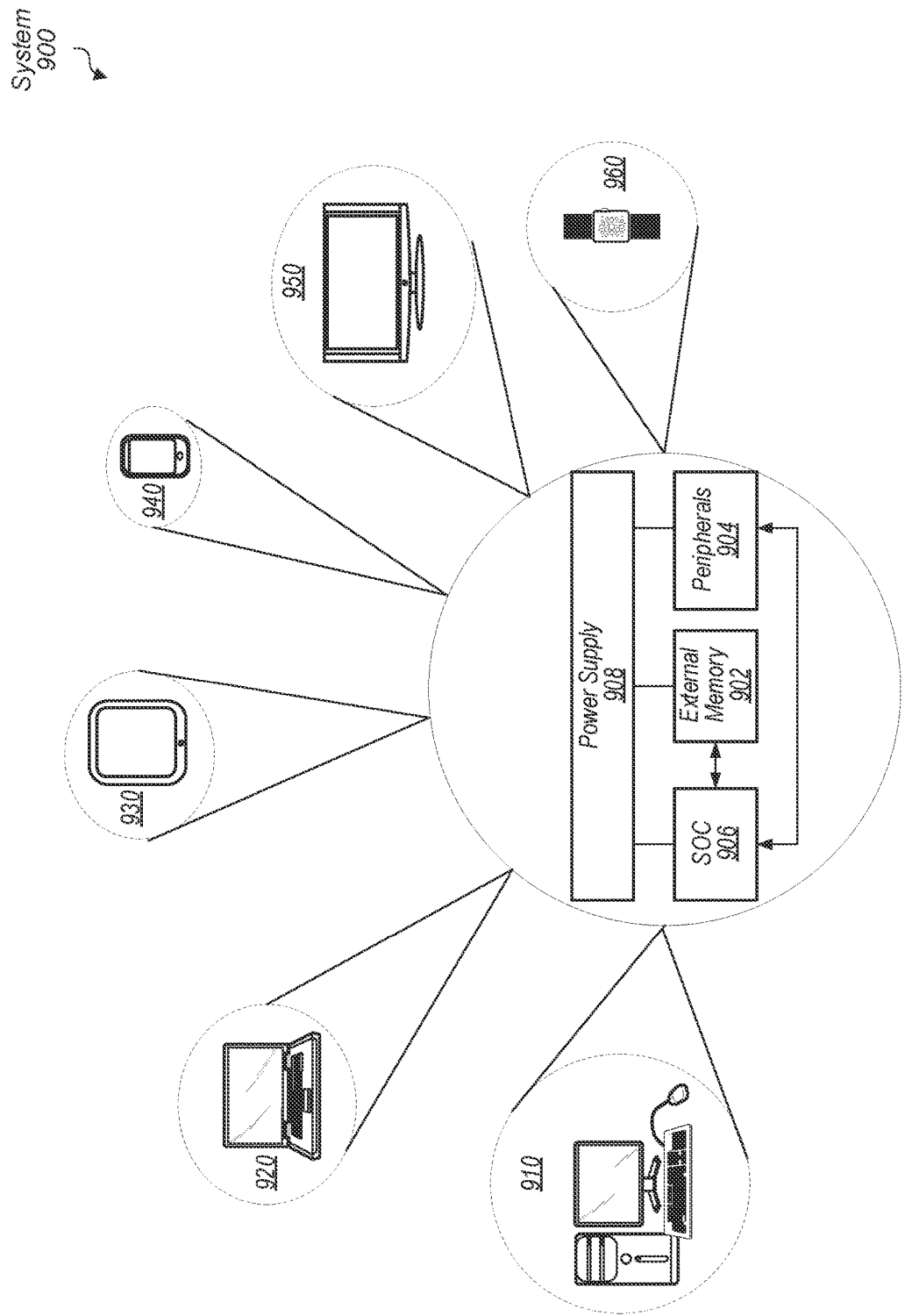
FIG. 9 is a block diagram of one embodiment of a system.

Turning next to FIG. 9, a block diagram of one embodiment of a system 900 is shown. As shown, system 900 represents chip, circuitry, components, etc., of a desktop computer 910, laptop computer 920, tablet computer 930, cell or mobile phone 940, television 950 (or set top box coupled to a television), wrist watch or other wearable item 960, or otherwise. Other devices are possible and are contemplated. In the illustrated embodiment, the system 900 includes at least one instance of a system on chip (SoC) 906 which includes multiple processors and a communication fabric. In some embodiments, SoC 906 includes one or more processor cores similar to processor pipeline core 800 (of FIG. 8), which includes branch prediction logic similar to logic 300 (of FIG. 3) and logic 400 (of FIG. 4). In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus, comprising:
   a table comprising circuitry, wherein the table comprises a plurality of table entries configured to store branch prediction information; and
   branch prediction circuitry configured to:
      generate an encrypted value, based at least in part on a program counter corresponding to a branch instruction;
      combine, using encryption circuitry, the encrypted value with a branch target address of the branch instruction to generate an encrypted branch target address; and
      store the encrypted branch target address in an entry of the table.

2. The apparatus as recited in claim 1, wherein the branch prediction circuitry is configured to store machine context information corresponding to the branch instruction in the entry.

3. The apparatus as recited in claim 2, wherein the branch prediction circuitry is configured to store the machine context information as a security tag in a security tag field of the entry.

4. The apparatus as recited in claim 2, wherein the branch prediction circuitry is further configured generate the machine context information based at least in part on one or more of an exception level, virtual machine identifier, privilege mode, process identifier, and a program counter.

5. The apparatus as recited in claim 2, wherein the branch prediction circuitry is configured to:
   detect a hit on the entry in the table, responsive to a first branch instruction; and
   prevent use of branch prediction information in the entry by the first branch instruction, responsive to a mismatch between at least a portion of a machine context of the first branch instruction and machine context information stored in the entry.

6. The apparatus as recited in claim 5, wherein the apparatus is configured to generate an exception responsive to the mismatch.

7. The apparatus as recited in claim 5, wherein the branch prediction circuitry is configured to allow use of the branch prediction information in the entry by the first branch instruction, responsive to a match between the machine context of the first branch instruction and the machine context information stored in the entry.

8. The apparatus as recited in claim 7, wherein the branch prediction circuitry is configured to update branch prediction training information stored in the entry, responsive to the match between the machine context of the first branch instruction and the machine context information stored in the entry.

9. A method, comprising:
generating an encrypted value, based at least in part on a program counter corresponding to a branch instruction;
combining the encrypted value with a branch target address of the branch instruction to generate an encrypted branch target address; and
storing the encrypted branch target address in an entry of a table.

10. The method as recited in claim 9, further comprising storing machine context information corresponding to the branch instruction in the entry.

11. The method as recited in claim 10, further comprising storing the machine context information as a security tag in a security tag field of the entry.

12. The method as recited in claim 10, further comprising generating the machine context information based at least in part on one or more of an exception level, virtual machine identifier, privilege mode, process identifier, and a program counter.

13. The method as recited in claim 10, further comprising:
detecting a hit on the entry in the table, responsive to a first branch instruction; and
preventing use of branch prediction information in the entry by the first branch instruction, responsive to a mismatch between at least a portion of a machine context of the first branch instruction and machine context information stored in the entry.

14. The method as recited in claim 13, further comprising generating an exception responsive to the mismatch.

15. The method as recited in claim 13, further comprising allowing use of the branch prediction information in the entry by the first branch instruction, responsive to a match between the machine context of the first branch instruction and the machine context information stored in the entry.

16. The method as recited in claim 15, further comprising updating branch prediction training information stored in the entry, responsive to the match between the machine context of the first branch instruction and the machine context information stored in the entry.

17. A processor, comprising:
instruction fetch circuitry configured to fetch instructions for execution;
execution circuitry configured to execute instructions fetched by the instruction fetch circuitry; and
branch prediction circuitry configured to:
generate an encrypted value, based at least in part on a program counter corresponding to a branch instruction;
combine, using encryption circuitry, the encrypted value with a branch target address of the branch instruction to generate an encrypted branch target address; and
store the encrypted branch target address in an entry of a table.

18. The processor as recited in claim 17, wherein the branch prediction circuitry is configured to store machine context information corresponding to the branch instruction in the entry.

19. The processor as recited in claim 18, wherein the branch prediction circuitry is configured to:
detect a hit on the entry in the table, responsive to a first branch instruction; and
prevent use of branch prediction information in the entry by the first branch instruction, responsive to a mismatch between at least a portion of a machine context of the first branch instruction and machine context information stored in the entry.

20. The processor as recited in claim 19, wherein the branch prediction circuitry is configured to allow use of the branch prediction information in the entry by the first branch instruction, responsive to a match between the machine context of the first branch instruction and the machine context information stored in the entry.

* * * * *